No. 879,574. PATENTED FEB. 18, 1908.
C. NEWMAN.
WHEEL TIRE CLAMP.
APPLICATION FILED MAY 4, 1907.
3 SHEETS—SHEET 1.
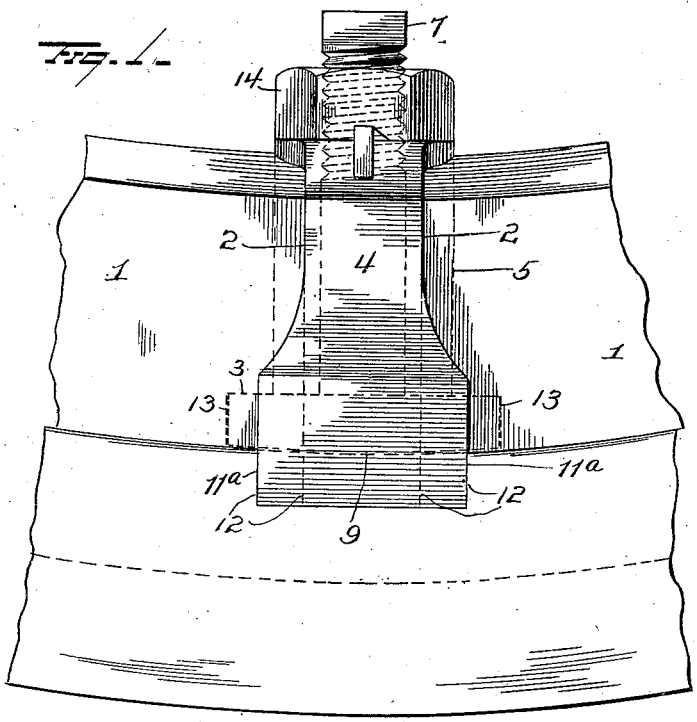
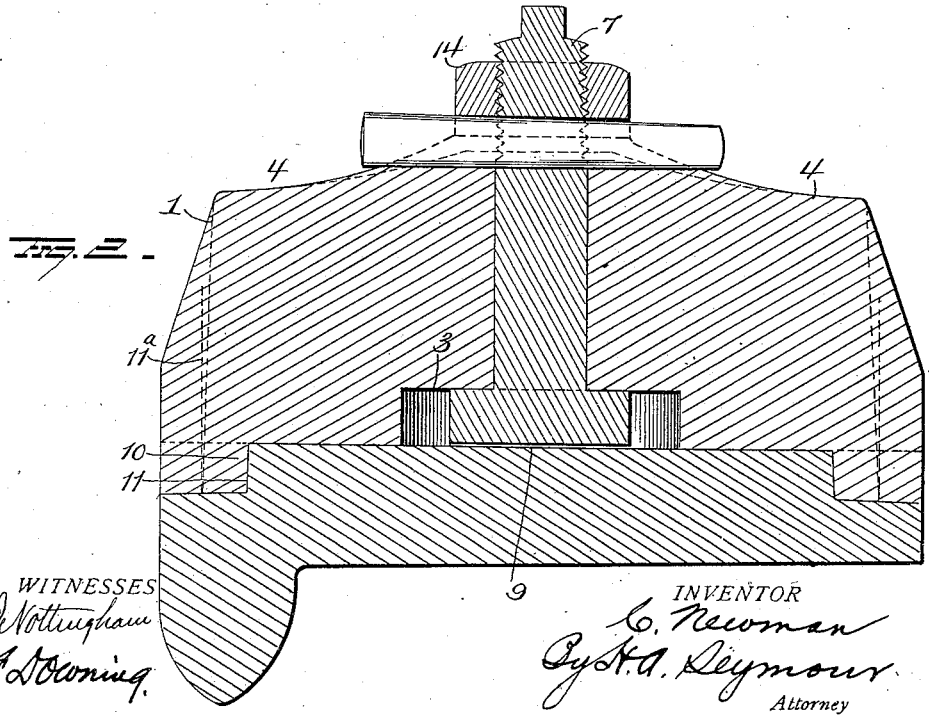
WITNESSES
INVENTOR
C. Newman
Attorney No. 879,574. PATENTED FEB. 18, 1908.
C. NEWMAN.
WHEEL TIRE CLAMP.
APPLICATION FILED MAY 4, 1907.
3 SHEETS—SHEET 2.
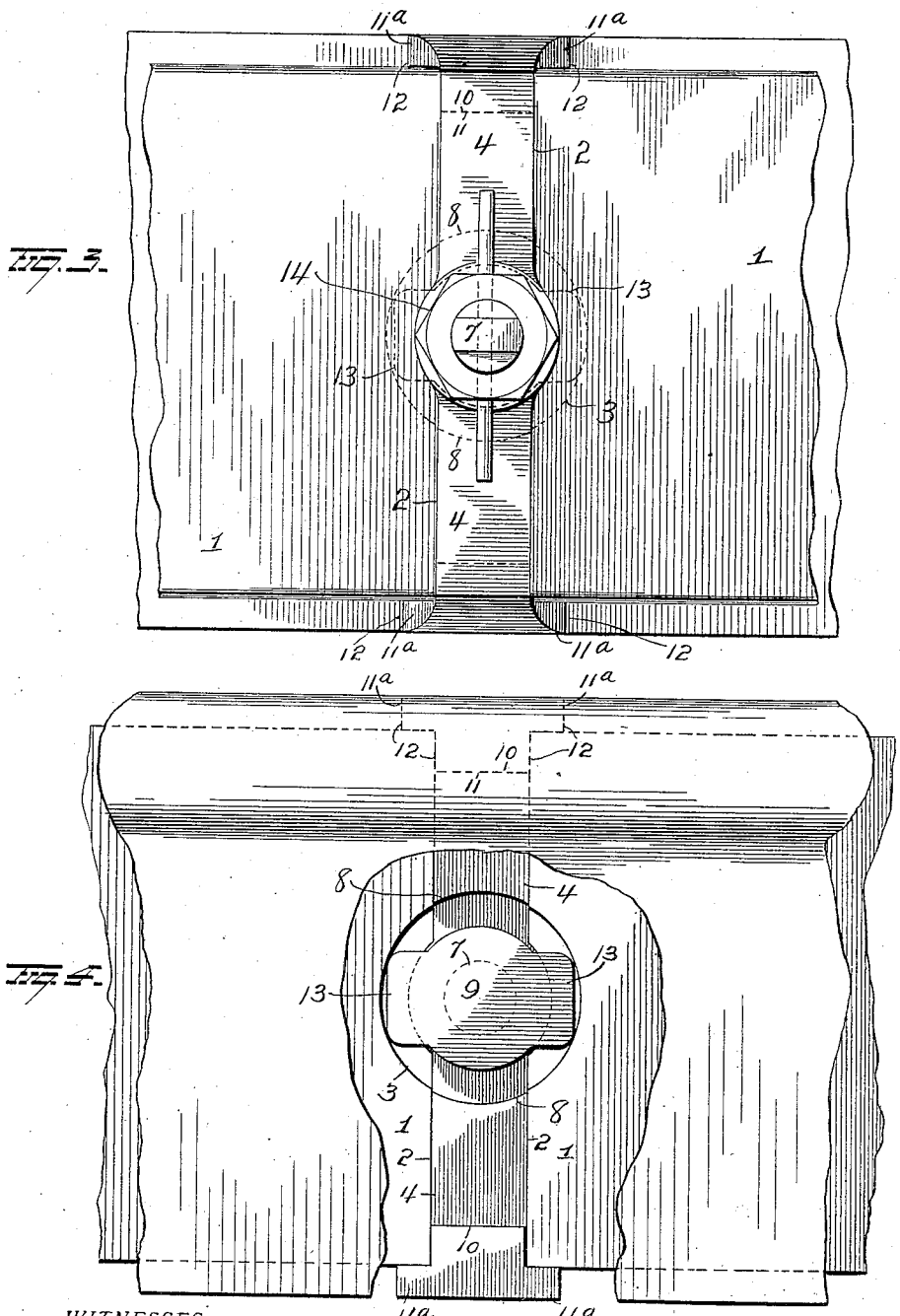
WITNESSES
INVENTOR
C. Newman
By H. A. Seymour
Attorney No. 879,574.
PATENTED FEB. 18, 1908.
C. NEWMAN.
WHEEL TIRE CLAMP.
APPLICATION FILED MAY 4, 1907.
3 SHEETS—SHEET 3.
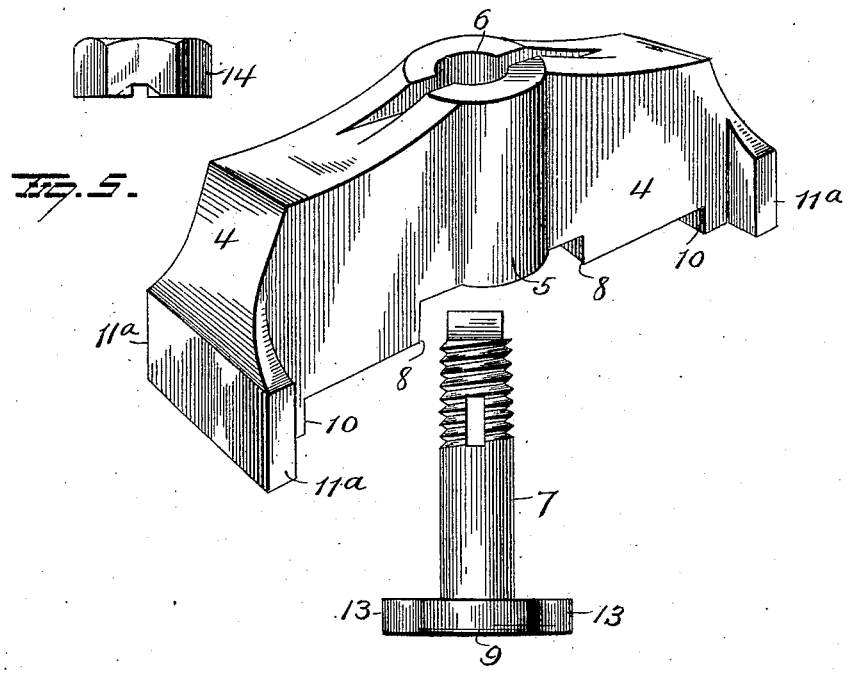
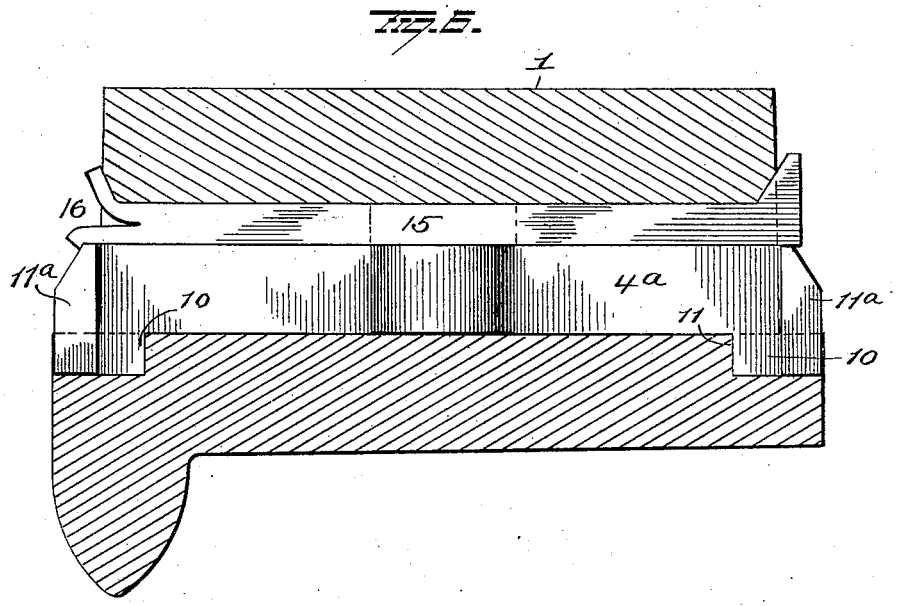
WITNESSES
E. J. Nottingham
G. J. Downing
INVENTOR
C. Newman
By H. A. Seymour
Attorney

UNITED STATES PATENT OFFICE.

CHARLES NEWMAN, OF STAUNTON, VIRGINIA.

WHEEL-TIRE CLAMP.

No. 879,574.  Specification of Letters Patent.  Patented Feb. 18, 1908.

Application filed May 4, 1907. Serial No. 371,832.

*To all whom it may concern:*

Be it known that I, CHARLES NEWMAN, of Staunton, in the county of Augusta and State of Virginia, have invented certain new and useful Improvements in Wheel-Tire Clamps; and I do hereby declare the following to be a full, clear, and exact description of the invention, such as will enable others skilled in the art to which it appertains to make and use the same.

My invention relates to an improvement in wheels for railway cars and particularly wheels having tires shrunk thereon, the object being to provide means for preventing any movement of the tire on the body of the wheel, or any movement of the body of the wheel within the tire, when the latter becomes heated and expanded from heat generated by frictoin of the brake shoes or rails.

With these ends in view my invention consists in a detachable clamp carried by and secured to the rim of the wheel, and engaging the tire at the opposite sides of the latter, whereby any independent slipping movement laterally or otherwise, of the tire and body of the wheel will be absolutely prevented.

My invention further consists in the details of construction and combination of parts as will be more fully explained and pointed out in the claims.

In the accompanying drawings, Figure 1 is a view in perspective from the inner side of a section of a locomotive driving wheel, showing my improvement thereon. Fig. 2 is a view in transverse section through same. Fig. 3 is a view of the inner face of the rim showing the seat for the clamp. Fig. 4 is a similar view of the outer face of the rim showing the seat for the head of the bolt. Fig. 5 is a view of the clamp, and Fig. 6 is a view of a modification.

In some makes of wheels, the rim is in four sections with a space between the sections, so that in shrinking a tire on the rim, the sections of the latter will be contracted or put under tension whereby they may expand to compensate for any expansion of the tire. In other forms the rim is cast solid.

I will first describe my improvement as applied to the sectional rim and then describe the modified form which is designed for use on wheels having a continuous cast tire.

1 represents the section of the rim of a drive wheel, and 2 the space between the ends of the sections. In applying a tire to this rim, the tire is first expanded by heating, and then applied in the usual way and permitted to cool and contract on the rim, after which the spaces between the sections are filled by the introduction of filling blocks. In applying my invention to an old wheel, the loose tire and filling blocks are removed, after which the ends of the sections 1 of the rims are cut away by a boring tool as at 2, and the outer face of the sections recessed as at 3 to receive the head of the bolt. In applying the invention to new wheels the boring and recessing would of course be done before the tire is secured in place.

After the rim has been bored and recessed as shown, the heated tire is placed in position and shrunk on the rim in the usual and well known manner. To absolutely prevent this tire from working loose when expanded by heat generated by the friction of the brake shoe and rail, I provide the clamps preferably one between each quarter section of the rim. This clamp 4, comprises a block of a width to fit snugly between the ends of the section of the rim, and provided centrally with an enlarged rounded section 5 which fits within the cut away portion 2 at the ends of the section of the rim and prevents any endwise movement of the clamp, this enlarged portion being provided with a hole 6 for the passage of the bolt 7. The top of the clamp is recessed as at 8, which when the clamp is in place, conforms to the recess 3 in the outer face of the rim sections, and forms a circular depressed seat for the head 9 of the bolt 7, thereby permitting the latter to rest in a plane within the periphery of the rim. The clamping block 4 is also provided near its opposite ends with shoulders 10 which bear against shoulders 11 formed within recesses in the inner face of the tire, and absolutely prevent any slipping movement of the tire on the rim, or the rim within the tire. The block is also provided at its ends with the laterally projecting lips 11ª which engage the side faces of the rim, and also engage the shoulders 12 on the sides of the tire, and assist in preventing endwise movement of the clamp, or any slipping movement of the tire, the side of the latter being recessed to receive the shoulder 12 and extreme ends of the clamp, thus bringing the latter in flush with the rim. The clamp thus described is introduced into its position from the inner side of the rim, and is locked in place by the bolt 7 the head 9 of which is made oblong in shape as shown, so that when given a quarter turn, the ends 13 of the head overlap the recessed portion of the rim and lock the clamp in place. By now tightening up on nut 14, and locking the nut (in the present instance I have shown a feather and groove lock); the parts will be held against the possibility of displacement.

This improvement can be applied to old wheels, on which the tires have become loosened and which must be repaired before the wheels can be used, as well as on new wheels, and while I have designed it particularly for use on locomotive drive wheels, I would have it understood that it is equally applicable to any and all wheels having a tire independent of the rim of the wheel.

In Fig. 6 I have shown a modified form of clamp designed for wheels having a continuous unbroken rim. In this construction the outer face of the rim is slotted to receive the clamp 4ᵃ the latter being identical in construction with clamp 4 except that it does not have a bolt hole, the bolt being dispensed with in this form of device. The slots in the rim of the wheel are sufficiently deep to permit the clamps to rest thereon with their outer surfaces in the plane of or within the plane of the rim, so as to permit the tire to be readily placed in position. After the tire has been shrunk on the rim, a key 15 having a split end 16 is driven in under the clamp thus forcing the latter out into engagement with the tire, as in the construction previously disclosed, after which the key 15 is locked in place by spreading its split ends.

It is evident that many slight changes might be resorted to in the relative arrangement of parts shown and described without departing from the spirit and scope of my invention hence I would have it understood that I do not wish to confine myself to the exact construction and arrangement of parts shown and described, but, Having fully described my invention what I claim as new and desire to secure by Letters-Patent, is:—

1. The combination with a wheel rim having a transverse recess, and tire, of a locking device located in the transverse recess in the rim and movable toward the tire to engage the latter.

2. The combination with a wheel rim provided with a recess enlarged at a point intermediate of its ends, and a tire, of a locking device disposed in the recess in the rim and engaging the tire, said locking device having an enlargement to enter the enlarged portion of the recess in the rim.

3. The combination with a wheel rim comprising sections, and a tire, of a block located and movable in the space between adjacent sections, said block adapted to engage the tire and hold the same against movement, and means for securing said block to the rim.

4. The combination with a wheel rim and tire shrunk thereon, of a clamp movable toward the tire and carried by the rim and having end flanges engaging shoulders at the sides of the tire, and means for locking the clamp in place within the rim.

5. The combination with a wheel rim and tire shrunk thereon, of a clamp carried by the rim and held against endwise movement therein and engaging the tire at the sides, and means for locking the clamp in place.

6. The combination with a wheel rim and a tire thereon, the rim having slots therein, of clamps located within the slots and movable toward the tire, each clamp being provided at its ends with means for engaging the tire, and means for locking each clamp in its clamping position.

7. The combination with a wheel rim having a slot therein and a tire on said rim, of a clamp located within the slot and movable toward the tire, and a bolt passing through the clamp and having a head adapted to engage the rim and lock the clamp in place, the said clamp engaging the tire at the sides thereof.

8. The combination with a wheel rim having a slot therein, and a recess in the outer face of the rim adjacent to the slot, of a clamp located within the slot and engaging the rim at the sides of the latter, a bolt passing through the clamp and provided with an elongated head adapted to rest within the recess in the rim and means for locking the bolt against movement.

9. The combination with a wheel rim having a slot therein the latter being enlarged at a point intermediate its ends, and a tire on said rim, of a clamp shaped to fit said slot and movable toward the tire, the said clamp having shouldered ends to engage the outer face of the tire, a bolt passing through the clamp, the head of the bolt engaging and resting on the rim, a nut for locking the bolt in place and a lock for the nut.

In testimony whereof, I have signed this specification in the presence of two subscribing witnesses.

CHARLES NEWMAN.

Witnesses:
A. W. BRIGHT,
R. S. FERGUSON.